(12) United States Patent
MacCallum et al.

(10) Patent No.: US 7,441,473 B2
(45) Date of Patent: Oct. 28, 2008

(54) VARIABLE-ALTITUDE TESTING SYSTEMS

(76) Inventors: Taber K. MacCallum, 3481 E. Michigan St., Tucson, AZ (US) 85714; Grant A. Anderson, 3481 E. Michigan St., Tucson, AZ (US) 85714

( * ) Notice: Subject to any disclaimer, the term of this patent is extended or adjusted under 35 U.S.C. 154(b) by 0 days.

(21) Appl. No.: 11/842,849

(22) Filed: Aug. 21, 2007

(65) Prior Publication Data

US 2008/0052051 A1    Feb. 28, 2008

Related U.S. Application Data

(60) Provisional application No. 60/823,217, filed on Aug. 22, 2006.

(51) Int. Cl.
G09B 9/16    (2006.01)
G01M 3/02    (2006.01)
G09B 9/52    (2006.01)

(52) U.S. Cl. ............................. 73/865.6; 434/34; 434/35
(58) Field of Classification Search ................ 73/865.6; 434/34, 35

See application file for complete search history.

(56) References Cited

U.S. PATENT DOCUMENTS

| | | | | |
|---|---|---|---|---|
| 3,010,220 A | | 11/1961 | Schueller | |
| 3,083,473 A | * | 4/1963 | Luton | 434/34 |
| 3,084,454 A | | 4/1963 | Schueller | |
| 3,135,057 A | * | 6/1964 | Nelson et al. | 434/34 |
| 3,161,968 A | * | 12/1964 | De Boy et al. | 434/34 |
| 3,177,672 A | * | 4/1965 | Seelandt | 62/45.1 |
| 3,224,277 A | * | 12/1965 | Chamberlin et al. | 73/865.6 |
| 3,295,223 A | * | 1/1967 | Zeff et al. | 434/34 |
| 3,302,463 A | * | 2/1967 | Marfone et al. | 73/865.6 |
| 3,327,536 A | | 6/1967 | Fitzgerald | |
| 3,396,584 A | | 8/1968 | Badin et al. | |
| 3,405,561 A | * | 10/1968 | Bogart | 73/865.6 |
| 3,442,139 A | * | 5/1969 | Munro | 73/865.6 |
| 3,534,485 A | * | 10/1970 | Simpson et al. | 434/34 |
| 3,709,026 A | | 1/1973 | Rhodes et al. | |
| 4,616,215 A | | 10/1986 | Maddalena | |
| 4,678,438 A | * | 7/1987 | Vykukal | 434/34 |
| 4,842,224 A | * | 6/1989 | Cohen | 244/171.9 |
| 5,110,294 A | * | 5/1992 | Brand et al. | 434/34 |
| 5,177,362 A | | 1/1993 | Reitman et al. | |
| 5,617,318 A | | 4/1997 | Clark | |
| 5,718,587 A | * | 2/1998 | Sussingham | 434/34 |
| 6,885,967 B2 | | 4/2005 | Rachlin | |
| 7,000,456 B2 | | 2/2006 | Lehman | |
| 8,388,893 | * | 5/2008 | Bigelow | 434/34 |
| 2003/0096215 A1 | * | 5/2003 | Than et al. | 434/34 |

FOREIGN PATENT DOCUMENTS

WO    WO9709024 A1    3/1997

* cited by examiner

*Primary Examiner*—David A. Rogers
(74) *Attorney, Agent, or Firm*—Stoneman Volk Patent Group; Martin L. Stoneman; Michael D. Volk, Jr.

(57) ABSTRACT

A ground-based system for simulating dynamic suborbital-flight environments occurring during substantially complete suborbital-flights by a flight vehicle.

19 Claims, 6 Drawing Sheets

VARIABLE-ALTITUDE TESTING SYSTEMS

CROSS-REFERENCE TO RELATED APPLICATION

The present application is related to and claims priority from prior provisional application Ser. No. 60/823,217, filed Aug. 22, 2006, entitled "Variable Altitude Dynamic Test Apparatus", the contents of which are incorporated herein by this reference and are not admitted to be prior art with respect to the present invention by the mention in this cross-reference section.

BACKGROUND

This invention relates to providing a system for improved ground-based simulating of dynamic flight environments occurring during suborbital flight by a flight vehicle and its on-board flight-vehicle systems. More particularly, this invention relates to providing a ground-based system for simulating highly variable pressure environments occurring during substantially complete suborbital flights by a flight vehicle.

Since the mid 1990's, a resurgence of interest has been building for suborbital space flight and the development of a private spaceflight industry. Currently, a number of commercial interests are developing flight-vehicle systems capable of carrying paying participants and micro-gravity scientific payloads to altitudes greater than 330,000 feet. Proposed suborbital vehicles are preferably capable of a conventional "aircraft-style" takeoff and landing and preferably utilize rocket propulsion to propel the crew and payload to near space altitudes. Such flight vehicles are subjected to a highly dynamic and variable progression of exterior-pressure environments during such flights.

Development programs for the above-described suborbital vehicles are inherently complex, typically requiring considerable ground-based support, testing, and pre-certification of flight hardware. For example, the flight vehicle's Environmental Control and Life Support Systems (ECLSS) must be rigorously tested to assure full and complete operation during the entire suborbital flight. ECLSS customarily function to provide a crew-habitable environment within the flight vehicle in addition to providing necessary cooling or heating of thermally sensitive onboard systems and components.

Currently, no ground-based system exists that provides essentially continuous altitude/pressure simulations correlating with the pressure-time profiles of essentially a full suborbital vehicle flight. Access to such simulated variable-pressure environments would be highly useful in ground-based testing of flight-vehicle systems, and especially in the testing and certification of Environmental Control and Life Support Systems (ECLSS) used during such high-altitude flights.

OBJECTS AND FEATURES OF THE INVENTION

A primary object and feature of the present invention is to provide a system overcoming the above-mentioned problems.

Another object and feature of the present invention is to provide such a system comprising a ground-based test system for simulating suborbital-flight environments occurring during substantially complete suborbital flights by a flight vehicle.

A further primary object and feature of the present invention is to provide such a system that is efficient, inexpensive, and useful. Other objects and features of this invention will become apparent with reference to the following descriptions.

SUMMARY OF THE INVENTION

In accordance with a preferred embodiment hereof, this invention provides a method related to ground-based testing of onboard flight-vehicle systems utilizing simulated suborbital flight environments occurring during at least one essentially complete suborbital flight, within at least one range of mapped pressure-time environments, by at least one flight vehicle, such method comprising the steps of: selecting at least one range of test variables required for a single test setup to test all situations within the variables; for the selected required test setup, selecting at least one first pressure vessel to assist in simulating onboard flight-vehicle environments and selecting at least one adjoining second pressure vessel, having, with such first at least one pressure vessel, at least one common-boundary test apparatus, to assist in simulating extra-vehicular flight environments; for at least one second pressure-vessel design, selecting at least one pressure-vessel volume suitable for all the required test variables; for the at least one selected pressure-vessel volume and such at least one range of test variables, selecting hardware/software combinations, including pressure modulating devices, having suitable technology and cost characteristics and being adapted to assist in control and measurement of such at least one range of test variables; wherein the steps of this method are used to produce at least one design useful in simulating pressure-time profiles corresponding to such suborbital flight environments during such at least one essentially complete suborbital flight by such at least one flight vehicle.

Moreover, it provides such a method further comprising the step of selecting such at least one volume of such second pressure vessel to be small enough to enable maintaining, at least under no-leak conditions, such at least one range of mapped pressure-time environments. Additionally, it provides such a method further comprising the step of selecting such at least one volume of such second pressure vessel to be large enough to enable maintaining, at least under maximum-projected-testable-leak conditions, such at least one range of mapped pressure-time environments. Also, it provides such a method further comprising the step of attaching each of a plurality of such at least one second pressure vessels with the same single one of such at least one first pressure vessel.

In addition, it provides such a method further comprising the step of computer-controlling and computer-measuring with a single computer system a plurality of respective tests relative to such respective plurality of such at least one second pressure vessels. And, it provides such a method wherein such computer-measuring comprises receiving test data from such at least one first pressure vessel. Further, it provides such a method wherein such plurality of such second pressure vessels comprise sufficient similarity in design to efficiently enable standardized testing.

In accordance with another preferred embodiment hereof, this invention provides a method of pressure testing, relating to leak effects within a primary pressure vessel comprising contents and at least one plurality of skin boundary portions, comprising the steps of: providing a plurality of ancillary pressure vessels, each such ancillary pressure vessel being at least small enough in volume that a selected pressure modulation system is suitable to control within at least one selected such ancillary pressure vessel at least one selected rapid pressure-time profile; providing at least one such suitable pressure modulation system; connecting, in a potential pressure/ leak communication relation, each such respective ancillary pressure vessel with at least one selected respective such skin boundary portion; and connecting such at least one suitable pressure modulation system in working relation with each such ancillary pressure vessel; wherein such method provides abilities to perform multiple testing procedures of such primary vessel environments within simulated rapid-pressure cycle environments. Even further, it provides such a method further comprising the step of providing, in relation to each such skin boundary portion, at least one test-assisting apparatus.

In accordance with another preferred embodiment hereof, this invention provides a system related to ground-based testing of onboard flight-vehicle systems, such system comprising: suborbital-flight-environment simulator means for simulating dynamic flight environments occurring during at least one substantially complete suborbital flight by at least one flight vehicle; wherein such suborbital-flight-environment simulator means comprises testing-chamber means for receiving such onboard flight-vehicle systems to be tested.

Furthermore, wherein such testing-chamber means comprises pressure boundary means for boundary containment of testing-chamber pressures within at least one interior portion of such testing-chamber means; antechamber means for communicating with such pressure boundary means of such testing-chamber means; pressure modulator means for modulating antechamber pressures within such antechamber means; pressure-controller means for assisting timeline controlling of such antechamber pressures; and chamber-pressure communicator means for enabling interactive pressure communication between such testing-chamber pressures and such antechamber pressures. In addition, wherein such antechamber means comprises such pressure boundary means; and wherein such antechamber means, such pressure modulator means, and such pressure-controller means are useful in simulating at least one pressure-time profile comparable to such flight environments occurring during such at least one substantially complete suborbital flight by such at least one flight vehicle.

In accordance with another preferred embodiment hereof, this invention provides a system related to ground-based testing of onboard flight-vehicle systems, such system comprising: at least one suborbital-flight-environment simulator structured and arranged to simulate dynamic suborbital flight environments occurring during at least one essentially complete suborbital flight by at least one flight vehicle; wherein such at least one suborbital-flight-environment simulator comprises at least one testing chamber structured and arranged to receive such onboard flight-vehicle systems to be tested; wherein such at least one testing chamber comprises at least one pressure boundary structured and arranged to provide boundary containment of testing-chamber pressures within at least one interior portion of such at least one testing chamber; at least one antechamber structured and arranged to communicate with such at least one pressure boundary of such at least one testing chamber; at least one pressure modulator structured and arranged to modulate antechamber pressures within such at least one antechamber; at least one pressure-controller structured and arranged to assist timeline controlling of such antechamber pressures by such at least one pressure modulator; and at least one chamber-pressure communicator structured and arranged to enable interactive pressure communication between such testing-chamber pressures and such antechamber pressures under flow conditions; wherein such at least one antechamber comprises such at least one pressure boundary; wherein such at least one antechamber, such at least one pressure modulator, and such at least one pressure-controller are useful in simulating pressure-time profiles corresponding to such suborbital flight environments during such at least one essentially complete suborbital flight by such at least one flight vehicle.

Moreover, it provides such a system wherein: such at least one pressure-controller comprises at least one pressure-time record structured and arranged to contain at least one timeline sequence of pressure setpoints corresponding to varying pressures of such at least one pressure-time profile; and such at least one pressure-controller is structured and arranged to utilize such at least one pressure-time record, essentially during interoperation with such at least one pressure modulator, to modulate such antechamber pressures to essentially match such varying pressures of such at least one pressure-time profile.

Additionally, it provides such a system wherein: such at least one pressure-controller comprises at least one pressure-time monitor structured and arranged to monitor such antechamber pressures during such timeline controlling of such antechamber pressures by such at least one pressure modulator; such at least one pressure-time monitor is structured and arranged to generate antechamber pressure data; and such at least one pressure-controller is structured and arranged to compare such antechamber pressure data to at least one setpoint of such at least one timeline sequence of pressure setpoints, and interoperate with such at least one pressure modulator to adjust such antechamber pressures to essentially match such at least one setpoint. Also, it provides such a system wherein such at least one pressure-time monitor comprises at least one electronic pressure transducer structured and arranged to generate such antechamber pressure data.

In addition, it provides such a system wherein such at least one chamber-pressure communicator comprises at least one configurable fluid exchanger structured and arranged to provide configurable exchange of at least one atmospheric fluid between such at least one testing chamber and such at least one antechamber. And, it provides such a system wherein such at least one chamber-pressure communicator comprises at least one gas transfer passage enabling fluid flow. Further, it provides such a system wherein such at least one pressure modulator comprises: at least one negative-pressure source structured and arranged to provide negative pressure; at least one positive pressure source structured and arranged to provide positive pressure; and at least one pressure manifold structured and arranged to communicate such negative pressure and such positive pressure to such at least one antechamber; wherein such at least one pressure manifold comprises at least one pressure-control assembly structured and arranged to control levels of such negative pressure and such positive pressure communicated to such at least one antechamber; and the operation of such at least one pressure-control assembly is at least partially controlled by such at least one pressure-controller.

Even further, it provides such a system further comprising a plurality of such at least one antechambers, each one capable of independent pressure generation with respect to such at least one pressure boundary of such at least one testing chamber. Even further, it provides such a system further comprising: at least one modular coupler structured and arranged to assist coupling of such at least one testing chamber to at least one additional testing chamber structured and arranged to receive such onboard flight-vehicle systems to be tested; wherein such at least one modular coupler is structured and arranged to enable pressure communication between such testing-chamber pressures of such at least one testing chamber and at least one interior portion of such at least additional one testing chamber.

Furthermore, it provides such a system wherein such at least one pressure-control assembly comprises: at least one negative-pressure control valve structured and arranged to control negative pressure communicated between such at least one negative-pressure source and such at least one pressure manifold; at least one positive-pressure control valve structured and arranged to control positive pressure communicated between such at least one positive-pressure source and such at least one pressure manifold; and wherein the operation of at least such at least one negative-pressure control valve is controlled by such at least one pressure-controller. Even further, it provides such a system wherein such at least one pressure-controller comprises: at least one pressure control algorithm to assist control of at least one chamber pressure using essentially such at least one pressure-time record and such pressure sensor data; at least one computer storage to store such at least one pressure control algorithm and such at least one pressure-time record; at least one computer input structured and arranged to receive such pressure sensor data; at least one computer processor to process such at least one pressure control algorithm; at least one computer output structured and arranged to output at least one algorithm-derived control signal to assist control of the operation of such at least one pressure modulator.

DETAILED DESCRIPTION OF THE BEST MODES AND PREFERRED EMBODIMENTS OF THE INVENTION

Figure 1:
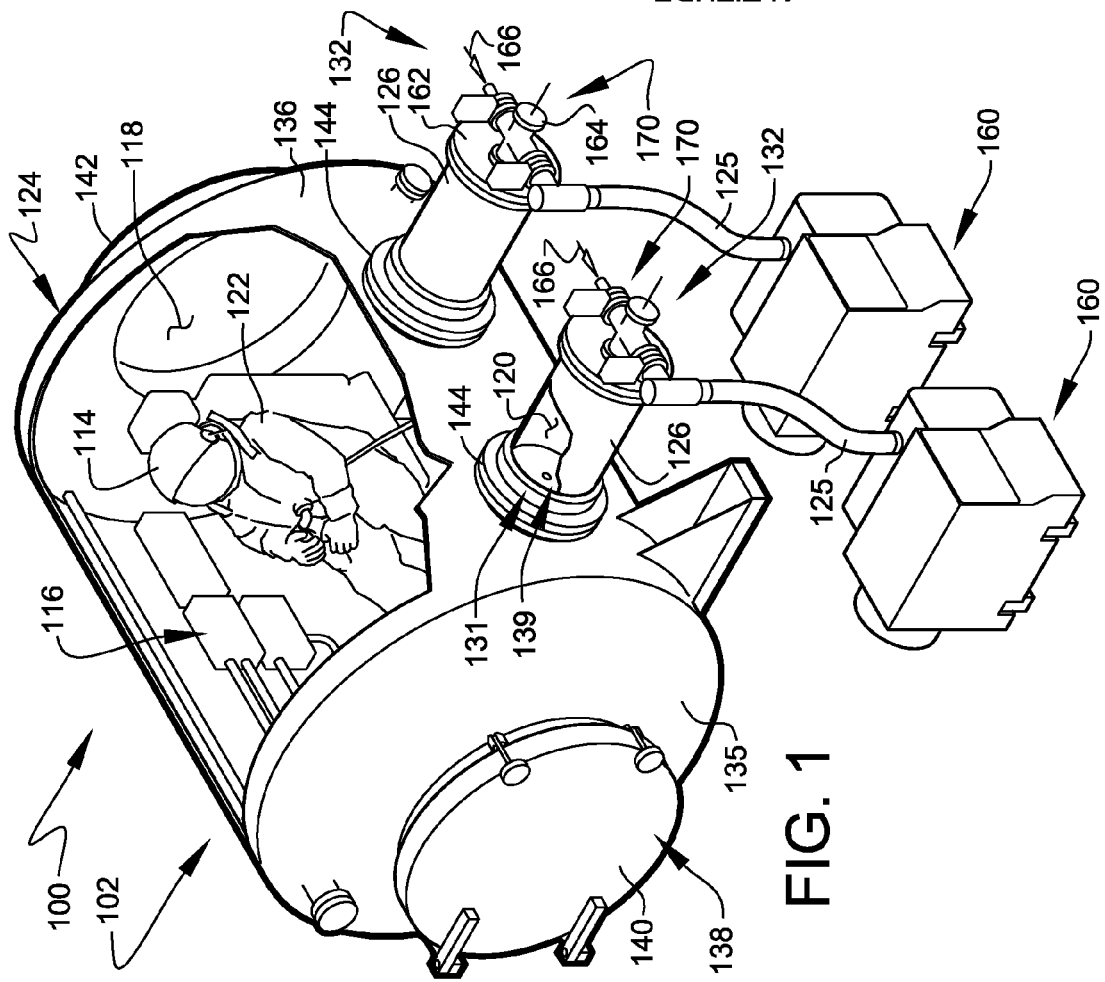
FIG. 1 shows a perspective view, in partial section, illustrating an ECLSS Human-rating Facility according to a preferred embodiment of the present invention.

FIG. 1 shows a perspective view illustrating an ECLSS Human-rating Facility ("EHF"), identified hereinafter as EHF 102, according to a preferred embodiment of the present invention. Preferred embodiments of variable-altitude testing system 100, preferably including EHF 102, function to continuously simulate onboard and extra-vehicular flight environments that may occur during substantially a complete suborbital flight by flight vehicle 103 (as described in FIG. 2). More specifically, EHF 102 preferably provides essentially continuous altitude/pressure simulations correlating with the changing static-pressure/time profiles of suborbital vehicle flights. These fast-changing simulated environments are useful in ground-based testing of flight-vehicle systems, and more preferably, in the testing and certification of Environmental Control and Life Support Systems (ECLSS) used during such high-altitude flights.

Figure 2:
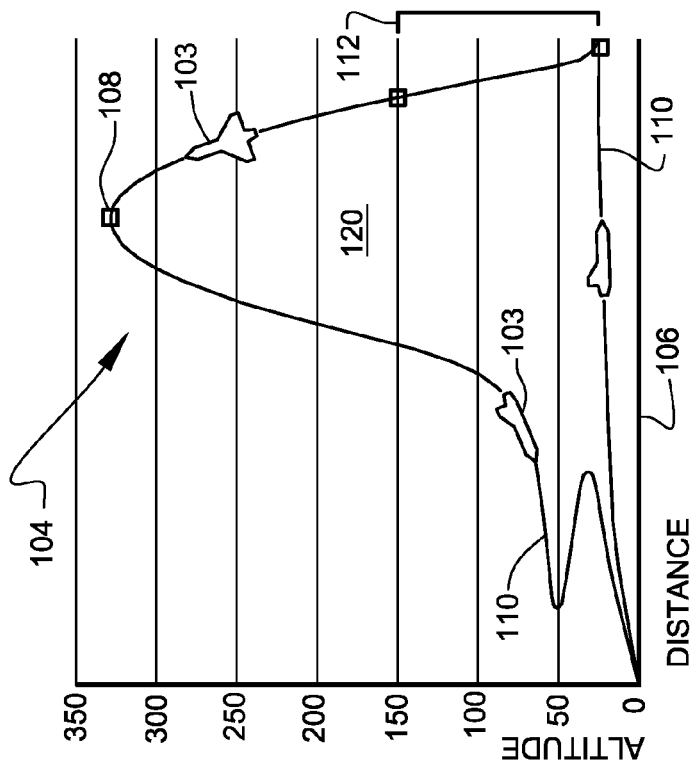
FIG. 2 shows a schematic diagram illustrating a typical mission flight profile for a manned flight vehicle that preferably falls within the preferred simulation capabilities of the preferred embodiment of FIG. 1.

FIG. 2 shows a schematic diagram illustrating a typical mission flight profile 104 for a manned flight vehicle 103 that preferably falls within the preferred simulation capabilities of EHF 102. In the example flight profile of FIG. 2, flight vehicle 103 comprises a hybrid-power aircraft capable of horizontal takeoff/landing using conventional turbojet power and extreme high-altitude flight using rocket power. During the depicted suborbital flight, flight vehicle 103 transitions from a ground-level elevation 106 climbing to a near-space apogee 108 at an altitude above 300,000 feet, as shown. As graphically illustrated by the diagram of FIG. 2, flight vehicle 103 experiences a diverse range of altitude transitions ranging from relatively gradual transitions, during the conventional turbojet-powered flight 110, to rapid transitions during the rocket-propelled ascent portion 112 of flight profile 104. Thus, flight vehicle 103 and its related subsystems are subjected to a highly variable progression of external static-pressure environments 120 during flight profile 104. The intent of the preferred embodiments of variable-altitude testing system 100 is to produce one or more "static-pressure" environments that are dynamically changing, preferably following a predetermined "mapped" suborbital-flight pressure-time profile, preferably corresponding to a significant portion of flight profile 104.

EHF 102 is preferably intended to test flight hardware on the ground in as similar to flight conditions as possible. EHF 102 preferably simulates the dynamic human spaceflight and exploration environments for onboard flight-vehicle systems, preferably including crewmembers 114 and ECLSS subsystems 116, as shown. EHF 102 preferably provides a means of testing ECLSS subsystem 116 of flight vehicle 103 by providing a pressure-controllable internal cabin-environment 118, comparable to the internal cabin-environment of flight vehicle 103, and substantially all critical ECLSS interfaces, preferably including extra-vehicular pressure environments (external static-pressure environment 120) as would be experienced outside of flight vehicle 103 during flight profile 104.

EHF 102 is preferably configurable to allow for testing of failure modes and effects (including abort modes), including recovery strategies for ECLSS subsystems 116. EHF 102 is preferably designed to simulate substantially all off-nominal or emergency conditions as well as preferably provide for hardware-in-the-loop (i.e., all hardware associated with ECLSS subsystem 116 under test), failure-modes, and failure-effects tests.

EHF 102 also preferably accommodates testing of pressure suits 122 and other components of ECLSS subsystems 116, preferably under far more dynamic conditions and failure scenarios than those that would occur in a normal suborbital flight. Upon reading the teachings of this specification, those of ordinary skill in the art will now understand that, under appropriate circumstances, considering such issues as intended use, advances in flight-vehicle technology, etc., applying herein teachings to other flight simulation arrangements, such as simulating pressure-time profiles for orbital and exploration missions, etc., may suffice.

Figure 3:
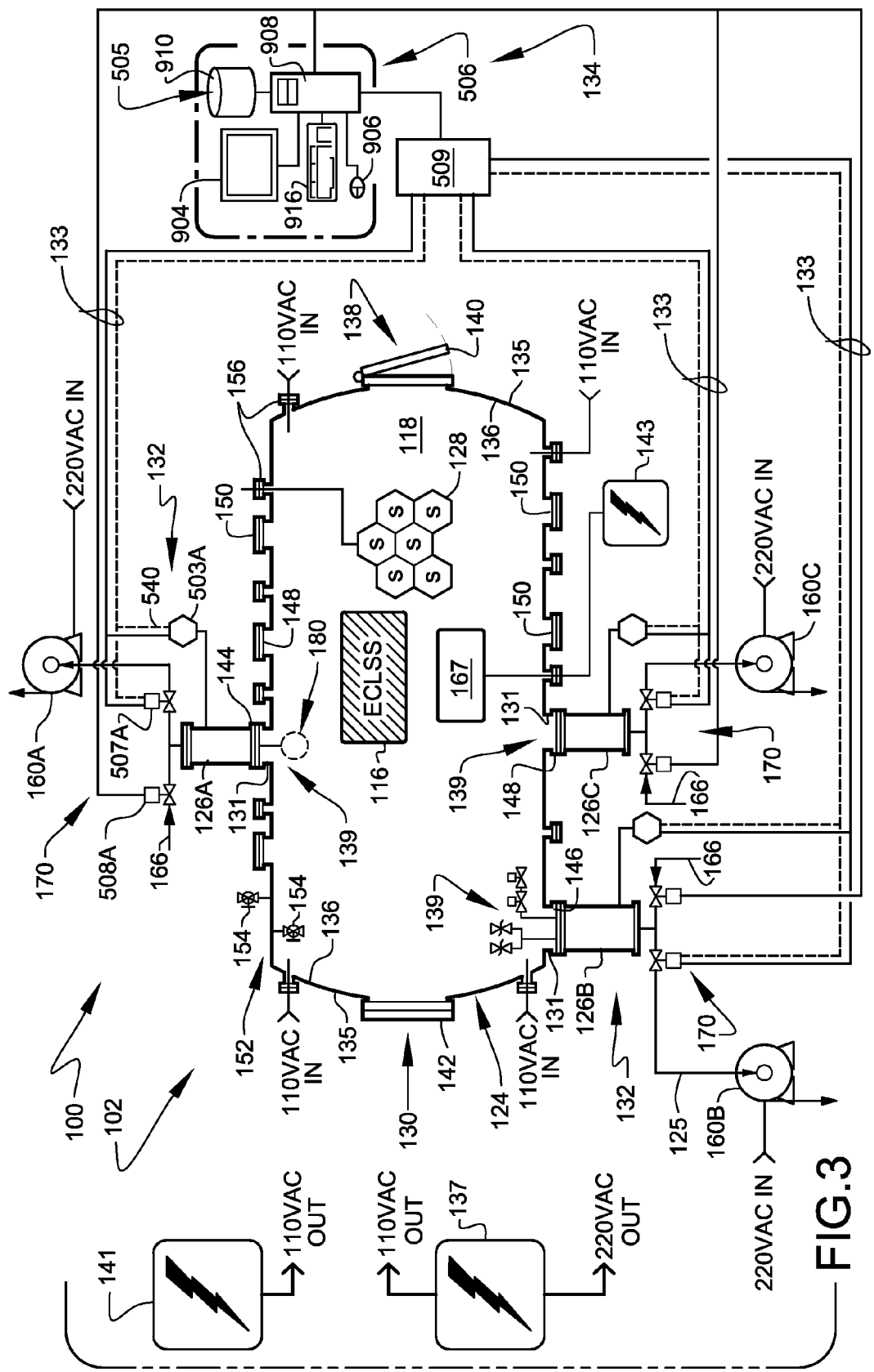
FIG. 3 shows a schematic diagram further illustrating the ECLSS Human-rating Facility according to the preferred embodiment of FIG. 1.

FIG. 3 shows a schematic diagram further illustrating preferred arrangements of EHF 102, according to the preferred embodiment of FIG. 1. The following descriptions with respect to the schematic diagram of FIG. 3 will be aided by continued reference to the illustration of FIG. 1.

Preferred operation of EHF 102 is preferably enabled by the coordinated interaction of four primary system subcomponents, preferably comprising; onboard-environment pressure simulation subsystem (OPSS) 130, external-environment pressure simulation subsystem (EPSS) 132, configurable pressure communication interface subsystem (CPIS) 139, and control subsystem 134, as shown. OPSS 130 is preferably designed to simulate the volume of a suborbital vehicle's pressure-controlled cabin. EPSS 132 is preferably adapted to simulate suborbital flight pressures outside the flight vehicle (external static-pressure environment 120). CPIS 139 preferably functions as a highly-adaptable pressure interface between the simulated suborbital flight pressures generated by EPSS 132 and the internal test environment of OPSS 130 (cabin-environment 118). Preferably, control subsystem 134 functions to control and monitor the overall operation of operation of EHF 102 with emphasis on the control and monitoring of EPSS 132. The following detailed descriptions describe the preferred coordinated operational interaction of the above-described system subcomponents preferably used to enable the operation of EHF 102.

The primary operational component of OPSS 130 preferably comprises a pressure-holding chamber identified herein as main pressure vessel 124, as shown. Main pressure vessel 124 is preferably adapted to simulate the pressurized cabin-environment of flight vehicle 103. Preferably, main pressure vessel 124 comprises a substantially continuous pressure boundary 136 structured and arranged to provide boundary containment of test pressures within cabin-environment 118. Pressure boundary 136 preferably provides a functional equivalent to the interior cabin wall of flight vehicle 103.

Preferably, EPSS 132 comprises one or more secondary pressure vessels, generically identified herein as antechambers 126, as shown. Preferably, EHF 102 uses antechambers 126 to generate the changing external static-pressure environments 120 used during simulator testing. More specifically, EPSS 132 preferably simulates a chosen flight (altitude/pressure-time) profile preferably by controlled modulation of gas pressures within at least one antechamber 126.

A more preferred embodiment of EPSS 132 comprises multiple antechambers 126, as shown. This preferred configuration preferably accommodates one or more venting requirements of ECLSS subsystems 116 (that must vent from main pressure vessel 124). In the preferred embodiment of FIG. 3, EPSS 132 comprises three separate antechambers 126, identified herein as antechamber 126A, antechamber 126B, and antechamber 126C, as shown. Upon reading the teachings of this specification, those of ordinary skill in the art will now understand that, under appropriate circumstances, considering such issues as intended test, ECLSS requirements, etc., other antechamber arrangements, such as the use of a single antechamber, the use of more than three antechambers, etc., may suffice.

Preferably, at least one of the plurality of antechambers 126 is preferably used to accurately simulate the chosen flight (altitude/pressure-time) profile during testing. Depending on the requirements of the test, the remaining antechambers may preferably provide similar flight pressure profiles, or alternately preferably, may be individually configured to simulate the correct environment as required to operate specific ECLSS elements, such as, for example, sensors, vents, etc.

Preferably, each antechamber 126 is directly mounted to pressure boundary 136, preferably over a large-diameter feed-through opening 131 within pressure boundary 136, as shown (at least embodying herein at least one antechamber structured and arranged to communicate with such at least one pressure boundary of such at least one testing chamber, and wherein such at least one antechamber comprises such at least one pressure boundary). Preferably, each antechamber 126 is structured and arranged to be removably mounted to pressure boundary 136 to facilitate test-specific reconfiguration of EHF 102.

CPIS 139 preferably controls the pressure interaction between antechambers 126 and main pressure vessel 124. Preferably, CPIS 139 functions as a readily reconfigurable pressure interface communicating between the simulated external static-pressure environments 120 generated by EPSS 132 and cabin-environment 118 of OPSS 130 (at least embodying herein at least one chamber-pressure communicator structured and arranged to assist interactive pressure communication between such testing-chamber pressures and such antechamber pressures). The principal physical structures of CPIS 139 are preferably located between the antechambers 126 and main pressure vessel 124, as best illustrated and described in FIG. 4.

Preferably, CPIS 139 is configurable to support a wide range of test variables and hardware requirements. Preferred configurations of CPIS 139 preferably enable critical flight-system testing, preferably including cabin leak simulations at the appropriate rates, overboard dump of $CO_2$ and other volatiles, testing of pressure relief systems (such as cryogenic "Dewar" off-gassing), testing of cabin overpressure relief, etc. In addition, CPIS 139 is preferably configurable to support testing of vehicle control instruments, such as altitude sensors, and other vehicle flight systems that can only be adequately tested by exposure to the variable pressure environments associated with flight profile 104.

Preferably, control subsystem 134 is structured and arranged to enable timeline-based controlling of the above-described antechamber pressures, preferably by enabling the control and monitoring of EPSS 132. The overall acquisition and control strategy of control subsystem 134 is preferably based on computer-implemented hardware control and data acquisition, as shown. The preference for computer-implemented hardware control is related to the need for control times of sufficient responsiveness as to maintain the antechambers 126 within the specified pressure profile.

In the preferred embodiment of FIG. 3, control subsystem 134 is preferably implemented using at least one control computer 506 communicating with at least one hardware controller 509, as shown. Preferably, control computer 506 is structured and arranged to enable the operation of antechamber pressure modulating computer program 505 (at least embodying herein at least one pressure-control algorithm). Antechamber pressure modulating computer program 505 preferably interoperates with hardware controller 509 to enable timeline-based control of antechamber pressures within the antechambers 126 of EPSS 132. Preferably, data acquisition is handled by a data interface within control computer 506, or alternately preferably, through an appropriately enabled interface module of hardware controller 509. In the preferred embodiment of FIG. 3, all control and measurement signals associated with the control of EPSS 132 are preferably routed through control computer 506 and hardware controller 509, as shown. Preferably, control along with data acquisition occurs via a series of signal links 133 preferably extending between control computer 506 and hardware controller 509 and the operational hardware of EPSS 132, as shown. Additional preferred acquisition and control strategies enabling control subsystem 134 are discussed in FIG. 4.

Preferably, main pressure vessel 124 is constructed from at least one fluid-impermeable material, preferably a material having substantially-rigid-material properties, preferably comprising a metallic material, more preferably comprising a ferrous material, most preferably stainless steel. The preferred physical geometry of main pressure vessel 124 is that of a hollow-cylindrical vessel, as shown. The preferred physical geometry of main pressure vessel 124 is preferably intended to generally match the size and volume of a suborbital vehicle's pressurized cabin. Main pressure vessel 124 is preferably of sufficient size to accommodate functional ECLSS subsystems 116 testing or crewmember 114 training for a range of suborbital vehicle platforms (at least embodying herein at least one testing chamber structured and arranged to receive such onboard flight-vehicle systems to be tested).

Thus, a preferred embodiment of main pressure vessel 124 comprises a generally cylindrical vessel preferably having a diameter of about 72 inches and a length of about 78 inches (generally equivalent to the cabin volume of flight vehicle 103). The preferred 72-inch diameter of main pressure vessel 124 favorably corresponds to a number of current suborbital vehicle deigns, including proposed flight vehicles developing within the commercial space industry.

Preferably, main pressure vessel 124 comprises an internal volume of at least about 180 cubic feet. Upon reading the teachings of this specification, those of ordinary skill in the art will now understand that, under appropriate circumstances, considering such issues as intended use, cost, testing variables, etc., other volumetric arrangements, such as the incorporation of internal dividers, internal pressure doors to subdivide the chamber volume, etc., may suffice. It is noted that main pressure vessel 124 is preferably configured to allow for modular expansion, preferably allowing for the coupling of additional chamber volumes, as described below.

Figure 6:
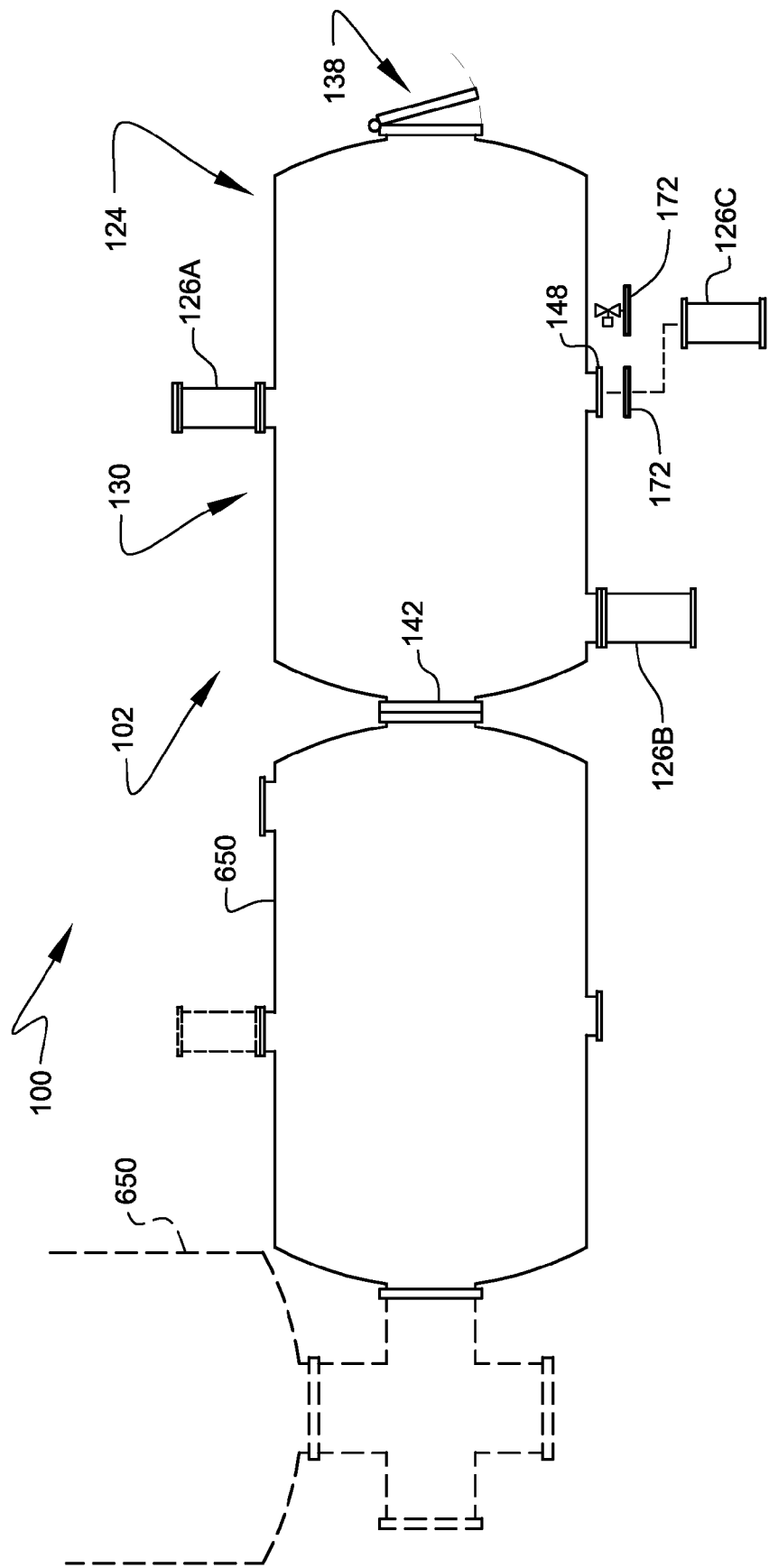
FIG. 6 shows a schematic diagram illustrating modular expansion capabilities of the ECLSS Human-rating Facility according to another preferred embodiment of the present invention.

Preferably, at least one end wall 135 of main pressure vessel 124 comprises access hatch 138 for moving test materials and crew in and out of main pressure vessel 124, as shown. Access hatch 138 is preferably sealable by an operable pressure door 140, as shown. The end wall 135 opposite access hatch 138 preferably comprises expansion port 142, as shown. Preferably, expansion port 142 enables expansion of the basic pressure vessel volume preferably by providing a connection point to additional pressure vessels, as best illustrated in the diagram of FIG. 6. Preferably, modular expansion port 142 is sealed against pressure transfer when not in use.

Preferably, main pressure vessel 124 is designed to meet applicable human-rated standards for pressure vessel failure tolerances. Preferably, main pressure vessel 124 is capable of structural containment of crew-inhabitable air pressure levels as well as off-nominal pressure scenarios during testing of ECLSS subsystems 116. More specifically, main pressure vessel 124 is preferably capable of structural containment of positive pressurization to at least 1.4 psig (approximating ground level pressures for various launch-site elevations) and the equivalent of a 10,000 feet per minute climb rate, depressurizing to an ultimate minimum pressure of at least about 5 Torr, more preferably $10^{-1}$ Torr, most preferably, about $10^{-2}$ Torr.

Preferably, as previously described, interaction between the interior and simulated exterior environments of main pressure vessel 124 preferably occurs through a series of openings within pressure boundary 136 with each opening preferably surrounded by a permanently mounted pressure flange, preferably an industry-standard flange, identified herein as mounting flange 144, as shown. Preferably, each mounting flange 144 provides a point of external access to cabin-environment 118, thus enabling integration of external system components with main pressure vessel 124, as shown. As previously noted, preferably, at least one of the mounting flanges 144 enables the coupling of an antechamber 126, as shown.

Preferably, each mounting flange 144 is configured to removably receive at least one compatible pressure fitting, preferably by bolted connection. The use of standardized flange-type fittings preferably enables efficient reconfiguration of EHF 102 between test programs, thus preferably accommodating varying test requirements. Preferably, each mounting flange 144 comprises an ASA compliant flange utilizing an O-ring type seal. Preferably, each mounting flange 144 is permanently joined to boundary 136, most preferably by thermal welding. CPIS 139 preferably utilizes the bolted connections of mounting flange 144 to further enable the above-noted quick and efficient reconfiguration of EHF 102 between tests, as further described in FIG. 4.

Preferably, access hatch 138 and expansion port 142 each comprise a flange preferably having an opening diameter of at least about 36 inches. Preferably, main pressure vessel 124 further comprises at least one 16-½-inch diameter flange 146 and three 12-inch flanges 148 (to preferably enable mounting of antechambers 126), as shown. Preferably, four 8-inch flanges 150 are used to support observation windows and/or feed-through of monitoring equipment/sensors. Preferably, two 4-½-inch pressure flanges 152 support emergency pressure vents 154 (one oriented inward and one oriented outward), as shown. In addition, preferably a plurality of 2-½-inch diameter pressure flanges 156 provide feed-through access for electrical, communications, sensor data, etc. Table A of this specification provides a general reference of preferred flange-related materials and sources. Upon reading the teachings of this specification, those of ordinary skill in the art will now understand that, under appropriate circumstances, considering such issues as intended use, testing requirements, etc., other operational arrangements, such as adapting one or more mounting flanges to provide airlock functionality, utilizing alternate coupler designs, etc., may suffice.

Preferably, each antechamber 126 (antechamber 126A, antechamber 126B, and antechamber 126C) comprises a hollow cylindrical pressure-rated vessel, preferably comprising a large-diameter flanged nipple, preferably mountable to one or more mounting flanges 144 of pressure boundary 136, as shown. Preferably, the material of each antechamber 126 is substantially similar to that of main pressure vessel 124, preferably comprising at least one fluid-impermeable material, preferably a material having substantially-rigid-material properties, preferably a metallic material, preferably a ferrous metal.

Figure 4:
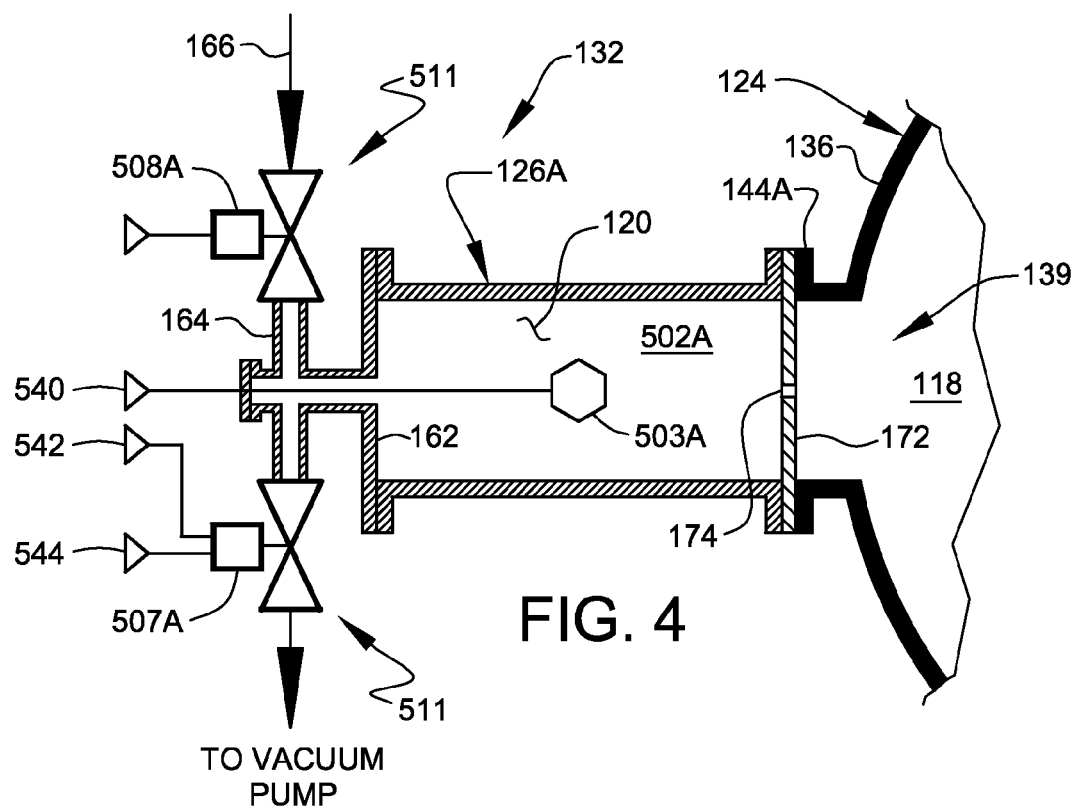
FIG. 4 shows a schematic sectional view, through a secondary pressure vessel of the ECLSS Human-rating Facility, illustrating a system for controlling and simulating suborbital flight profiles of altitude and time, according to the preferred embodiment of FIG. 1.

The preferred internal volume of antechamber 126 is selected to be sufficiently large as to enable maintaining, at least under maximum-projected-testable-leak conditions, the chosen flight pressure (altitude/pressure-time) profile during testing, as described in FIG. 4. Conversely, the preferred internal volume of antechamber 126 is preferably selected to be to be sufficiently small as to enable maintaining, at least under no-leak conditions, the chosen flight pressure (altitude/pressure-time) profile during testing, as discussed in FIG. 4. Upon reading the teachings of this specification, those of ordinary skill in the art will now understand that, under appropriate circumstances, considering such issues as required test accuracy/pressure resolution, performance of pressure control subsystems (including valve-response times), advances in pressure control technologies, etc., other volume relationships, such as the utilizing of larger pressure-containing volumes, smaller pressure-containing volumes, systems requiring essentially no volumetric buffering, systems utilizing the interaction effects derived through the use of multiple chamber volumes, etc., may suffice.

In the example embodiment of EHF 102, antechamber 126A and antechamber 126C each preferably comprises an interior volume of between about 700 cubic inches and about 800 cubic inches; and the illustrated best embodiment has a volume of about 771.7 cubic inches. Preferably, the larger antechamber 126B comprises an interior volume of between about 1000 cubic inches and about 2000 cubic inches. And the illustrated best embodiment of antechamber 126B comprises a volume of about 1513.8 cubic inches.

Preferably, each antechamber 126 comprises a means for receiving a connection to at least one pressure source, as shown. Preferably, in order to avoid the necessity for the fabrication of a large custom flange, pressure access to the interior of antechamber 126 is preferably made through a small cross 164, preferably located within blanking plate 162 of the distal end flange, as best shown in FIG. 1 and FIG. 4. Cross 164 preferably supports the principle pressure control hardware of EPSS 132, identified herein as pressure-control assembly 170, as shown. Pressure-control assembly 170 preferably comprises one or more pressure-control valves, as shown and described in FIG. 4. Preferably, pressure-control assembly 170 is structured and arranged to physically control levels of negative pressure and positive pressure communicated to antechamber 126 and is preferably controlled by control subsystem 134.

Preferably, EPSS 132 comprises at least one negative-pressure source, most preferably generated by one or more vacuum pumps, generically identified herein as vacuum pumps 160, as shown. Most preferably, each antechamber 126 is supplied negative pressure by a dedicated vacuum pump 160, as shown. Preferably, antechamber 126A and antechamber 126C are each serviced by a vacuum pump 160, identified herein as vacuum pump 160A and vacuum pump 160C respectively, as shown. Preferably, both vacuum pump 160A and vacuum pump 160C each comprise a preferred pumping speed of about 129.5 cubic feet per minute (180 cubic meters/hour). A commercially available pump preferred for use as vacuum pump 160A and vacuum pump 160C preferably comprises a Leybold Sogevac Coarse Vacuum (Sogevac® SV Series) Rotary Vane Pump model SV200 by Oerlikon Leybold Vacuum GmbH of Cologne, Germany. Preferably, the larger antechamber 126B is serviced by vacuum pump 160B, as shown. Preferably, vacuum pump 160B comprises a preferred pumping speed of about 41.8 cubic feet per minute (59 cubic meters/hour) and, under typical test simulations, no minimum nominal flow requirements. A commercially available pump preferred for use as vacuum pump 160A and vacuum pump 160C preferably comprises a Leybold Sogevac Coarse Vacuum (Sogevac® SV Series) Rotary Vane Pump model SV200 by Oerlikon Leybold Vacuum GmbH of Cologne, Germany. It is noted that vacuum pumps 160 may preferably require refitting with a lubricating fluid of low combustibility. The use of a lubricating fluid, such as, for example, a product marketed under the "Fomblin" name, is preferred when gases vented through antechamber 126 comprise an oxygen content greater than about 20%. Preferably, a flexible pressure hose 125 is used to couple a vacuum pump 160 to its respective pressure-control assembly 170, as shown.

Preferably, vacuum pumps 160 are supplied by 220 VAC, 30 amp electrical circuits. This voltage is preferably supplied by at least one portable electrical generator 137, as shown. Alternately preferably, 220 VAC electrical power is supplied from an electrical panel within the testing site, such panel preferably linked to a larger electrical power grid. Other components of EHF 102 may preferably utilize either 110 VAC line voltage 141 or low-voltage power from 28 VDC power supply 143, as shown. Upon reading the teachings of this specification, those of ordinary skill in the art will now understand that, under appropriate circumstances, considering such issues as intended use, component composition, testing requirements, portability/transportability requirements, etc., other electrical power arrangements, such as specialized power sources/voltages, emergency battery backups, "clean" power sources for operating power-sensitive systems, etc., may suffice.

EPSS 132 further preferably comprises at least one positive pressure source 166 used during modulation of antechamber pressures. For earth-based simulation, positive pressure source 166 preferably comprises access to the local ambient atmosphere, as shown. Alternately preferably, positive pressure source 166 may comprise a specific gas or gas mixture. For example, testing of flight hardware for Martian suborbital missions may require the use of a positive-pressure gas mixture containing a preponderance of carbon dioxide.

Figure 5:
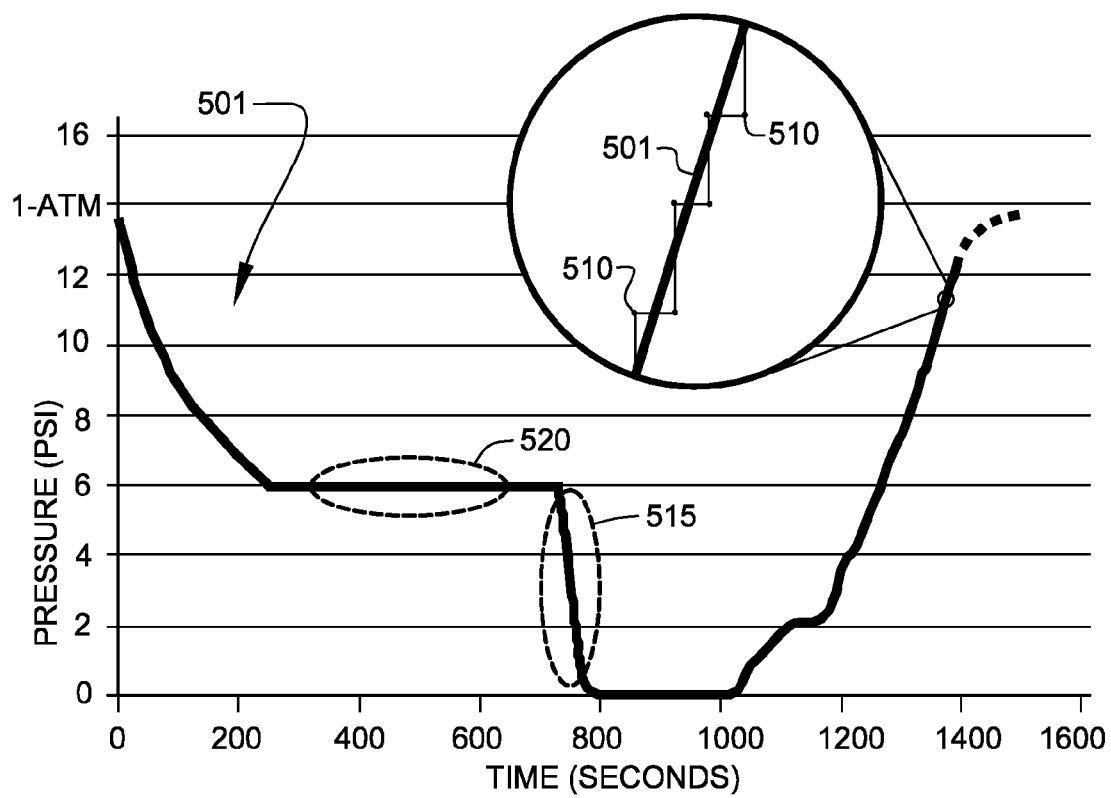
FIG. 5 shows a plot, illustrating an example suborbital-flight environment profile of altitude and time, according to the preferred embodiment of FIG. 3.

FIG. 4 shows a schematic diagram, further illustrating dynamic external-environment pressure simulation subsystem (EPSS) 132 for controlling and simulating a substantial portion of at least one suborbital-flight pressure-time profile 501 (see FIG. 5) that preferably correlates with at least one suborbital flight path 104, as shown in FIG. 2. FIG. 5 shows a plot, illustrating an example suborbital-flight pressure-time profile 501, according to the preferred embodiment of FIG. 3. Example suborbital-flight pressure-time profile 501 is typical of modern "rocketplane" suborbital-flight pressure-time profiles as represented by suborbital flight path 104. The following descriptions with respect to the schematic diagram of FIG. 4 will be aided by continued reference to the illustrations of FIG. 1 and FIG. 3.

For clarity of discussion, antechamber 126A will form the primary basis for the following descriptions related to the preferred implementations of EPSS 132. It is noted that the preferred implementation of each antechamber within EPSS 132 is substantially similar, as shown in FIG. 3. Furthermore, it is noted that EPSS 132 preferably modulates at least one antechamber pressure, identified herein as antechamber pressure 502A, such that antechamber pressure 502A preferably mirrors suborbital-flight pressure-time profile 501, preferably within the following (altitude) tolerances: within 200 feet (about 0.1 pounds per square inch absolute pressure (psia) or about 1%) from sea level to 60,000 feet; 500 to 1000 feet (about 0.05 psia or about 5%) from 60,000 feet to 110,000 feet; and <about 20% (of about 0.02 psi) above 110,000 feet.

EPSS 132 also preferably modulates antechamber pressure 502A, such that maximum rate of change of antechamber pressure 502A is preferably greater than about 0.05 psia per second, within an accuracy range of between about 2% and about 10%, depending on altitude, throughout suborbital-flight pressure-time profile 501.

Preferably, antechamber 126A of EPSS 132 preferably utilizes at least one pressure sensor, more preferably at least one digital pressure sensor 503A, to sense antechamber pressure 502A, as shown. Preferably, signal data for antechamber pressure 502A is preferably acquired by control subsystem 134, more preferably by antechamber pressure modulating computer program 505 preferably running on control computer 506, as shown in FIG. 3. Preferably, such signal data is transmitted by way of signal link 133, more preferably signal link 540, as shown.

Preferably, control subsystem 134 decreases antechamber pressure 502 when antechamber pressure modulating computer program 505 sends at least one signal to controller 509 to operate vacuum conductance-control butterfly throttling-valve (VCBTV) 507A, as shown (at least embodying herein at least one computer output structured and arranged to output at least one pressure control algorithm-derived control signal to control the operation of said at least one pressure modulator). VCBTV 507A is preferably connected to both antechamber 126A and vacuum pump 160A (see FIG. 3) and preferably functions to physically control pressure communication therebetween. Preferably, control signals from controller 509 are conducted to VCBTV 507A via signal link 542, as shown. In addition, it is preferred to return valve-status data (valving positions, etc.) for VCBTV 507A to control subsystem 134 by way of signal link 544, as shown. Additional hard links to VCBTV 507A may preferably occur, as required, to support valve operation (such as, supply of operational power).

Control subsystem 134 preferably increases antechamber pressure 502A when antechamber pressure modulating computer program 505 sends at least one signal to controller 509 to operate back-fill conductance-control butterfly throttling-valve (BCBTV) 508A, preferably connected to antechamber 126A and to positive pressure source 166, as shown. As previously indicated, positive pressure source 166 preferably comprises either ambient air or at least one compressed gas which simulates atmospheric gases of a planetary or lunar body.

Antechamber pressure modulating computer program 505 is preferably programmed to change setpoint 510 of antechamber pressure 502A so that a substantial portion of at least one suborbital-flight pressure-time profile 501 (see FIG. 5) is simulated. Upon reading the teachings of this specification, those of ordinary skill in the art will now understand that, under appropriate circumstances, considering such issues as intended use, advances in technology, etc., other valve and control arrangements, such as the use of valve systems based on mass-flow sensing, the use of autonomous sensing/correction capabilities, partial analog implementations, etc., may suffice.

Thus, as those skilled in the art will now appreciate upon reading this specification, pressure control in a cavity can preferably be achieved by using two or more conductance-control butterfly throttling-valves (generically identified herein as CBTV 511), where at least one CBTV 511 is connected to a vacuum source (such as VCBTV 507A to vacuum pump 160A) and at least one CBTV 511 is connected to at least one back-fill gas source (such as BCBTV 508A to positive pressure source 166) that is higher-pressure than the cavity where pressure control is desired (herein antechamber 126A). CBTV 511 preferably acts in a simple closed feedback loop when connected on either side to a vacuum pump (vacuum pump 160A, or vacuum pump 160B, or vacuum pump 160C) and the volume to be controlled (one or more antechambers 126). Pressure sensor 503A preferably senses present-time antechamber pressure 502A and compares it to desired antechamber pressure setpoint 510 (preferably enabled by the operation of antechamber pressure modulating computer program 505 and control computer 506). Control computer 506 through controller 509 then adjusts the valve position of CBTV 511 accordingly to achieve desired antechamber pressure setpoint 510.

As previously stated, the preferred intent of EHF 102 is to have antechamber pressure 502A follow a predetermined profile (suborbital-flight pressure-time profile 501). As CBTV 511 follows suborbital-flight pressure-time profile 501, CBTV 511 must, at times, quickly vary its open-close position over a wide range. An extreme example is rocket-propelled portion 515 of suborbital flight altitude-time profile 501 (see FIG. 5), where a fairly constant pressure changes to a rapidly changing pressure (i.e., time rate of change of pressure goes from about zero to rates as high as negative 10 psia per second in just a few milliseconds).

It is noted that CBTV 511 gain and phase-lead needed for optimum performance may be potentially different as CBTV 511 operates at different valving positions. Typical CBTVs 511 fully-closed to fully-open response times range between about 150 milliseconds and about two seconds. This typical CBTV 511 response-time range (150 milliseconds to about two seconds) will be a design variable to the system designer, especially during the rocket-propelled portion 515 (see FIG. 5) of suborbital flight altitude-time profile 501. During rocket-propelled portion 515 of suborbital flight altitude-time profile 501 control computer 506, through controller 509, must signal CBTV 511 to transition from a closed or near-closed position to a significantly-open position, preferably in the range of about 100 milliseconds to about 250 milliseconds, and if CBTV 511 is near the fully-open position, the simulation accuracy may be correlated with CBTV 511 response-time. Control computer 506, through controller 509, can largely compensate for any CBTV 511 (or other then design-specified valve) response-time limitations by signaling CBTV 511 to start opening (or closing) at a time earlier then when actually required by suborbital flight altitude-time profile 501.

Ability to fully seal the antechamber when CBTV 511 (or other then design-specified valve) is in the fully-closed position may limit simulation accuracy during glide portion 520 (see FIG. 5) of suborbital flight altitude-time profile 501. Control computer 506, through controller 509, may preferably compensate for such sealing characteristics of CBTV 511 (or other valves) preferably by adding sufficient makeup-gas through BCBTV 508A into antechamber 126A to maintain antechamber pressure 502A at or near suborbital flight altitude-time profile 501. Control computer 506, through controller 509, may preferably accomplish this correction by requiring a nominal increase in the amount of gas flowing into antechamber 126A to increase antechamber pressure 502A as required, and thus to mimic suborbital flight altitude-time profile 501. Upon reading the teachings of this specification, those of ordinary skill in the art will now understand that, under appropriate circumstances, considering such issues as advances in valve technology, seal technology, etc., other valve arrangements, such as the use of enhanced seals within the butterfly throttling-valves, etc., may suffice.

It is further noted that complex test-generated pressure conditions may require design attention to the preferred ability of control subsystem 134 to maintain the preferred operational control of EPSS 132 within the above-described tolerance limits. Testing of ECLSS subsystems 116 may require control computer 506, through controller 509, to control cabin-environment 118 by venting gas through one or more antechambers 126. In the example test setup of the preferred embodiment of FIG. 3, gases are preferably vented to multiple antechambers 126 by the depicted venting arrangements of CPIS 139. For example, in the depicted test setup of FIG. 3, gas is vented to antechamber 126A through O2/N2 overboard vent arrangement 180, as shown. Venting gases through one or more antechambers 126 would not necessarily be a design condition if it were at a constant flow rate, but ECLSS subsystem 116 may run its own control algorithm (as determined by separate ECLSS subsystem manufacturer), concurrent with the operation of control subsystem 134 of EHF 102, which may create variable gas flow-rates through one or more other antechambers 126 (for example, antechamber 126C), as ECLSS subsystem 116 makes adjustments and reacts to the dynamics of suborbital flight altitude-time profile 501. Similarly, variable gas flow-rates, through antechamber 126C may also be created by configuring CPIS 139 to simulate leaks and ruptures in, for example, antechambers 126B. These requirements dictate gas flow-rate changes that vary independently of suborbital flight altitude-time profile 501.

Analysis has shown that if the absolute-maximum flow-rate allowed for simulated leaks and ruptures in one or more antechambers (preferably matching antechamber 126C) is preferably about ⅓ of the pumping capacity of vacuum pump 160C, then the effects of simulated leaks and ruptures are more easily incorporated into antechamber pressure modulating computer program 505. Additionally, such leaks and ruptures are primarily a concern when flight vehicle 103 is at or near its apogee 108 (see FIG. 2), when the effects of leaks and ruptures are most severe. Thus, leak and rupture simulated testing are likely to be active during the higher altitude portion of suborbital flight altitude-time profile 501.

Since pumping capacity of vacuum pump 160C is oversized by a factor of about three, a CBTV 511 will not need to operate at near full-open position. Since CBTVs 511 potentially permit a large percentage of their maximum flow to pass through with only a relatively small open-angle, the specified VCBTV 507C can typically operate in a region near the closed position. The fact that VCBTV 507C can typically operate in a region near the closed-position is beneficial when control subsystem 134 (control computer 506, through controller 509) simulates abrupt variations in rate-of-pressure change as discussed above.

Experimentation shows that antechamber 126C, which may preferably be configured to create a pressure-differential for both overboard-venting of ECLSS subsystem 116 and leak/rupture simulation, require about ½ cubic foot of volume and can support throughput-flow-rates up to about 48 CFM when connected to vacuum pump 160C, sized for maximum flow rate of at least three-times greater than throughput-flow-rate. Thus, those of ordinary skill in the art will now appreciate that the teachings presented herein may be used by experienced hardware engineers and software programmers to, without undue experimentation, develop and implement the above-described preferred embodiments of variable-altitude testing system 100 over a wide range of systems for simulation suborbital testing.

Preferably, control subsystem 134 (at least embodying herein at least one pressure-controller) comprises at least one pressure-time record, preferably an electronic database containing one or more timeline sequences of antechamber pressure setpoints 510. As previously noted, pressure setpoints preferably correspond to the varying static-pressures of the actual pressure-time profile.

Preferably, control computer 506 and hardware controller 509, of control subsystem 134, are preferably configured to utilize setpoint data from the pressure-time record to control the pressure modulating hardware of EPSS 132. The preferred effect of this arrangement is to modulate the antechamber pressures so as to essentially match the varying static-pressures of a selected pressure-time profile.

Preferably, antechamber pressure data acquired by control subsystem 134 from digital pressure sensor 503A is preferably passed to antechamber pressure modulating computer program 505 where the sensor data is compared with the target pressure setpoint derived from the pressure-time record. Preferably, antechamber pressure modulating computer program 505, control computer 506, and hardware controller 509 together interoperate with the pressure modulating hardware of EPSS 132 to adjust antechamber pressures to essentially match the target pressure setpoint of the database. The above-described arrangements at least embody herein at least one pressure-time monitor structured and arranged to monitor such antechamber pressures during such timeline controlling of such antechamber pressures by said at least one pressure modulator.

Preferably, antechamber pressure modulating computer program 505 may be written, in whole or in part, by an experienced LabVIEW programmer, preferably utilizing LabVIEW software provided by National Instruments Corp. of Austin, Tex. As previously described, antechamber pressure modulating computer program 505 preferably enables the preferred operation of control computer 506 and hardware controller 509.

Preferably, control computer 506 comprises at least one logic processor 908 and at least one data storage device 910, preferably least one mass storage device of sufficient capacity to store antechamber pressure modulating computer program 505 (as shown), the operating system instructions for the at least one logic processor, at least one database-type record containing pressure-setpoint data, and software required to support operational interaction with hardware controller 509. Upon reading the teachings of this specification, those of ordinary skill in the art will now understand that, under appropriate circumstances, considering such issues as intended use, and testing, etc., other computer storage arrangements, such as providing additional capacity to support data acquisition, data logging, system diagnostic testing algorithms, etc., may suffice.

Preferably, control computer 506 further comprises user-interface devices of the sort well known in the art. For example, control computer 506 preferably comprises at least one display screen or monitor 904, keyboard 916, mouse 906, etc. Preferably, control computer 506 comprises at least one Pentium-class PC-type computer, preferably running a Microsoft Windows-based software operating system. Preferably, control computer 506 further comprises customary I/O facilities/bus access preferably enabling data acquisition and interoperation with hardware controller 509. This may preferably include the integration of one or more data-acquisition boards within the data bus of control computer 506.

Hardware controller 509 preferably provides the primary hardware interface between control subsystem 134 and pressure modulating hardware of EPSS 132. Upon reading the teachings of this specification, those of ordinary skill in the art will now understand that, under appropriate circumstances, considering such issues as intended use, advances in computer-control technology, etc., other control arrangements, such as utilizing a single (unified) controller-enabled PC computer, etc., may suffice. Hardware controller 509 preferably comprises a sufficient number of control channels and data-acquisition channels to match the control and monitoring requirements of the pressure modulating hardware of EPSS 132, as described above. It is noted that data acquisition subsystems of EHF 102 are preferably designed to be closely compatible with "customer/user" control systems to be tested (which preferably includes a substantially large range of outside customer/user control systems, software operating systems, and associated flight or flight test software/hardware combinations). Preference for the development of a "user-system-compliant" data-acquisition subsystem preferably enables delivery of cost-effective "hardware-in-the-loop" testing by EHF 102.

Hardware controller 509 may preferably comprise a relatively flexible PXI-based instrumentation platform, thus enabling straightforward modular reconfiguration of hardware controller 509 as measurement and automation requirements of EHF 102 change (to address specific customer/user testing requirements). Functionality of hardware controller 509 may be further enabled by a platform supporting interchangeable acquisition and control modules, each one structured and arranged to interoperate with an implementation of the LabVIEW OS running on control computer 506. Alternately preferably, hardware controller 509 may preferably comprise a platform having an embedded processor structured and arranged to run at least one local implementation of the LabVIEW operating system, in addition to a preferred combination of acquisition and control modules. Upon reading the teachings of this specification, those of ordinary skill in the art will now understand that, under appropriate circumstances, considering such issues as intended use, advances in technology, etc., other control systems arrangements, such as utilizing alternate control platforms, such as Compact FieldPoint, FieldPoint, CompactRIO, dedicated standard desktop PCs, etc., may suffice.

Data acquisition for EHF 102 preferably extends to environment monitoring within cabin-environment 118, as shown in FIG. 3. Preferably, EHF 102 comprises a grouping of cabin-environment sensors 128 preferably located within main pressure vessel 124, as shown. These sensors preferably include: calibrated CO2 partial pressure sensors; O2 partial pressure sensors; total pressure sensors; humidity sensors; differential pressure sensors; and temperature sensors. Upon reading the teachings of this specification, those of ordinary skill in the art will now understand that, under appropriate circumstances, considering such issues as intended use, life safety requirements, atypical testing conditions, etc., other sensor arrangements, such as smoke sensors, carbon dioxide/monoxide sensors, volatile gas sensors, chemical-specific sensors, vibration sensors, sound-level sensors, motion sensors, etc., may suffice.

Depending on the nature of the test, data from cabin-environment sensors 128 may preferably be used by antechamber pressure modulating computer program 505 during control of EPSS 132. In addition, data from cabin-environment sensors 128 may preferably be used by ECLSS subsystems 116.

Alternately preferably, cabin-environment sensors 128 are used to address crew life-safety issues by passing critical crew habitability data to safety controls of control subsystem 134. Subsystems of EHF 102, preferably including control subsystem 134, are preferably configured to allow an operator control system to abort any test mode if an off-nominal operation may endanger the crewmembers. Thus, control subsystem 134 may preferably comprise both manual and automatic test-abort capabilities (preferably including conditional abort triggers designed within antechamber pressure modulating computer program 505). Upon reading the teachings of this specification, those of ordinary skill in the art will now understand that, under appropriate circumstances, considering such issues as intended use, testing scope, etc., the utilization of other life-safety components, such as emergency fire-detection subsystems, automatic fire-suppression subsystems, emergency oxygen subsystems, etc., may suffice.

EHF 102 preferably comprises additional support subsystems 167 related to crew habitation and monitoring, preferably including cabin lighting, cabin air circulation, and audio/video subsystems (preferably enabling communication between an external operator and internal crewmembers 114).

It is again helpful to make reference to the enlarged diagram of FIG. 4. Preferably, both VCBTV 507A and BCBTV 508A are coupled to a common pressure manifold structured and arranged to communicate such negative pressure and such positive pressure to antechamber 126A, as shown. Preferably, in order to avoid the necessity for the fabrication of a large custom flange, the manifolding of pressure to the interior of antechamber 126A is preferably made through cross 164, preferably located within blanking plate 162 of the distal end flange, as shown.

VCBTV 507A is preferably based on a fast-response butterfly-type valve. A preferred valve suitable for use as VCBTV 507A preferably comprises an Intellisys "smart butterfly valve" with integrated pressure controller, produced by Celerity, Inc. of Allen Tex. This valve is also preferably suitable for use as BCBTV 508A. Upon reading the teachings of this specification, those of ordinary skill in the art will now understand that, under appropriate circumstances, considering such issues as intended use, advances in pressure-control technology, etc., other pressure-control arrangements, such as the use of large-capacity mass-flow valves, proportioning-type valves, gate-type valves, etc., may suffice.

The preferred structures and arrangements of configurable pressure communication interface subsystem (CPIS) 139 are clearly visible in preferred antechamber embodiment schematically depicted in FIG. 4. Preferably, the principal component of CPIS 139 comprises a removable pressure barrier 172, removably mounted between antechamber 126A and mounting flange 144A of pressure boundary 136, as shown.

Preferably, pressure barrier 172 comprises a solid plate suitably configured to form a pressure-resisting seal with both the mounting flange of antechamber 126A and mounting flange 144A of pressure boundary 136, as shown. In most testing scenarios, pressure barrier 172 preferably begins as a blank flange-type plate having both mating surfaces prepared with grooves to receive ASA-type O-rings. Preferably, pressure barrier 172 is modified to the requirements of a selected test, as described below. Preferably, each pressure barrier 172 is structurally rated for high-vacuum use, preferably to $1\times10^{-8}$ Torr. Preferred blanking plates suitable for use as pressure barrier 170 include bolt-mounted, ASA O-ring grooved flanges, produced by MDC Vacuum Products, LLC of Hayward, Calif. (see Table A).

Prior to testing, pressure barrier 172 is preferably modified to accommodate the specific requirements of the test simulation. For example, to preferably simulate a cabin-leak condition, a simple aperture 174 is preferably formed in pressure barrier 172, as shown. Thus, the reaction of ECLSS subsystem 116 to the passage of atmospheric fluids between the antechamber and main chamber can be observed during the simulation of suborbital-flight pressure-time profile 501. The preferred removable configuration of pressure barrier 172 (at least embodying herein at least one chamber-pressure communicator comprising at least one configurable fluid exchanger structured and arranged to provide configurable exchange of at least one atmospheric fluid between said at least one testing chamber and said at least one antechamber) allows efficient reconfiguration of EHF 102 between tests. For example, the first pressure barrier 172, comprising a small aperture 174, may be quickly replaced by a second pressure barrier 172 comprising an alternate sized aperture 174. The prior aperture examples present only the simplest potential embodiments of pressure barrier 172. In a majority of preferred test scenarios, pressure barrier 172 preferably comprises sufficient size, thickness, and material quality to allow machining of the plate to receive a substantially large range of pressure fittings, sensors, valve, membranes, etc. Alternately preferably, pressure barrier 172 may comprise other preferred physical characteristic. For example, pressure barrier 172 may preferably be constructed from an actual material to be tested (such as an experimental material requiring permeability testing or testing to derive pressure-cycling data by repeated exposure to variable antechamber pressures associated with suborbital-flight pressure-time profile 501). Thus, CPIS 139 preferably provides a highly configurable interface for pressure communication between cabin-environment 118 antechamber pressure 502A (simulating the changing external static-pressure environment 120). The example preferred embodiment of FIG. 3 illustrates several anticipated preferred configurations of CPIS 139. Preferably, a dedicated pressure barrier 172 is removably mounted between main pressure vessel 124 and each antechamber 126, as shown. Preferably, the dedicated pressure barriers 172 function to control pressure communication between main pressure vessel 124 and each respective antechamber 126, as shown. Preferably, the dedicated pressure barriers 172 have been modified to preferably accommodate test valves placed on the vehicle, cryogen venting required by ECLSS subsystems 116, and leak-rate simulation test, as described above.

FIG. 6 shows a schematic diagram illustrating modular expansion capabilities of EHF 102, according to another preferred embodiment of the present invention. Preferably, expansion port 142 of main pressure vessel 124 enables expansion of the basic pressure vessel volume by providing a connection point to additional pressure vessels 650, as shown. Upon reading the teachings of this specification, those of ordinary skill in the art will now understand that, under appropriate circumstances, considering such issues as intended test program, etc., other expansion port arrangements, such as utilizing the expansion port to test airlock systems, testing of docking port pressure interface hardware, providing a communication interface between larger external pressure-simulation chambers, etc., may suffice.

It is noted that pressure vessels 650 may preferably comprise substantially identical configurations to that of OPSS 130. Alternately preferably, preferred embodiments of pressure vessel 650 may comprise a simple pressure-containing vessel, preferably enabling only the expansion of cabin-environment volume rather than the pressure modulation functions provided by OPSS 130. FIG. 6 also shows a schematic depiction of the reconfiguring of a test setup by removal of antechamber 126C from 12-inch diameter flange 148 to preferably allow removal and replacement of a first pressure barrier 172 with a second pressure barrier 172 of alternate configuration.

Figure 7:
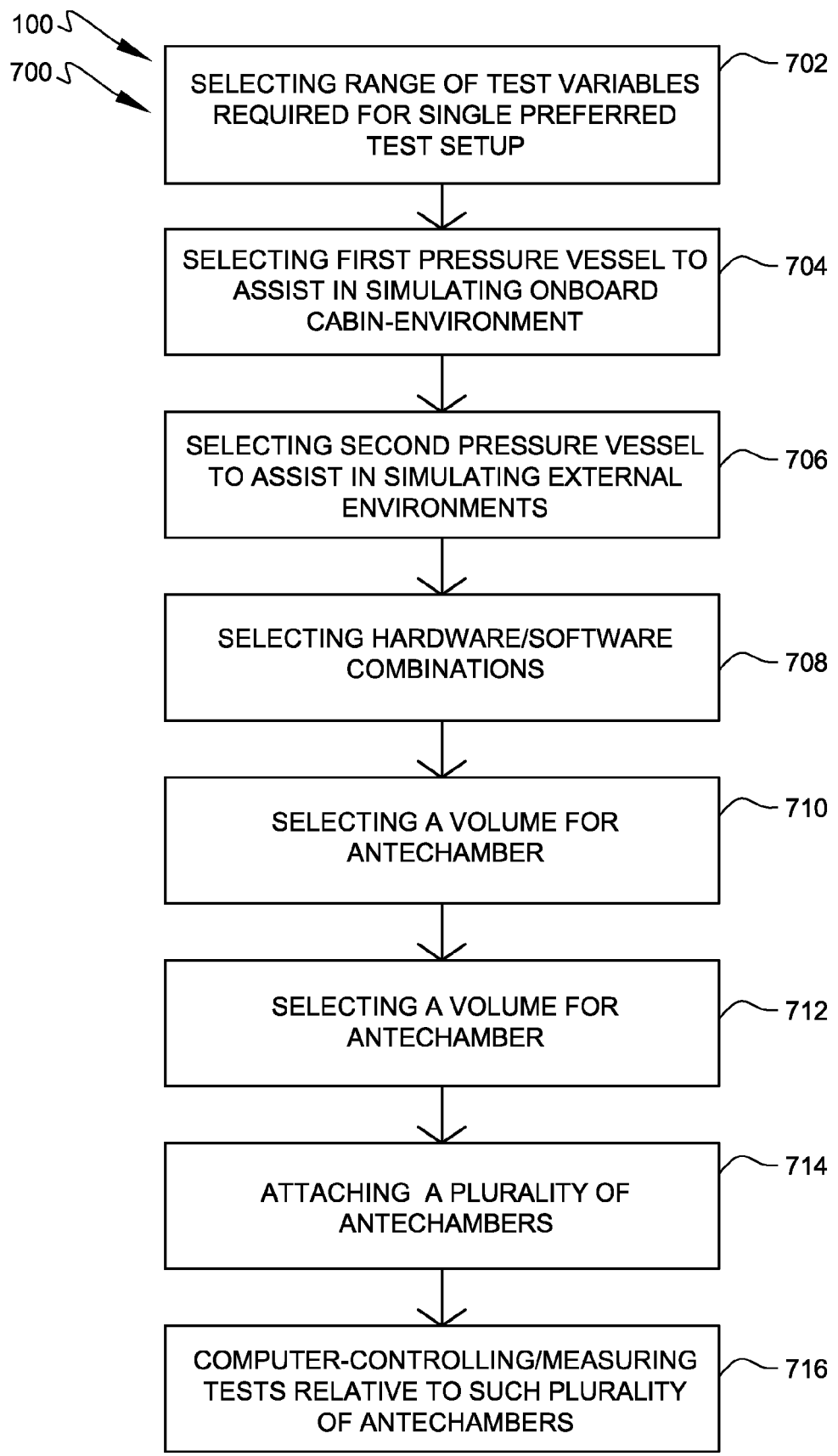
FIG. 7 shows a schematic diagram illustrating a preferred method of designing preferred embodiments of the variable-altitude testing system according to a preferred method of the present invention.

FIG. 7 shows a schematic diagram illustrating a preferred method of designing preferred embodiments of variable-altitude testing system 100, according to a preferred method of the present invention. Thus, in accordance with preferred method 700 of the present invention, there is provided, related to ground-based testing of onboard flight-vehicle systems (preferably including ECLSS subsystems 116) utilizing simulated dynamic suborbital flight environments occurring during at least one essentially complete suborbital flight profile 104, within at least one range of mapped pressure-time environments (essentially matching suborbital-flight pressure-time profile 501), by at least one flight vehicle 103, such method 700 preferably comprises the following preferred steps.

First, selecting at least one preferred range of test variables required for a single preferred test setup to test all situations within the preferred variables, as indicated in preferred step 702. This may preferably include configuring CPIS 139, installing ECLSS subsystems 116 within main pressure vessel 124, etc.

Next, for the selected required test setup, at least one first pressure vessel (main pressure vessel 124) to assist in simulating onboard cabin-environment 118 is selected along with at least one adjoining second pressure vessel (antechamber 126), having, with such first at least one pressure vessel, at least one common-boundary test apparatus (of CPIS 139), to assist in simulating dynamic extra-vehicular flight environments, as indicated in preferred step 704. Preferably, for antechamber 126 (at least embodying herein at least one second pressure-vessel design), next selecting at least one preferred pressure-vessel volume suitable for all the required test variables, as indicated in preferred step 706.

In addition, for the selected pressure-vessel volume and range of test variables of the prior steps, next preferably selecting hardware/software combinations, including pressure-modulating devices of EPSS 132, having suitable technology and cost characteristics and being preferably adapted to assist in control and measurement of such range of test variables, as indicated in preferred step 708.

The above-described preferred steps of method 700 are preferably used to produce at least one preferred embodiment of variable-altitude testing system 100 useful in simulating pressure-time profiles corresponding to such suborbital flight environments during such at least one essentially complete suborbital flight profile 104 by such at least one flight vehicle 103 (see FIG. 1 and FIG. 2).

Moreover, method 700 further comprises the preferred step 710 of selecting a volume for antechamber 126 sufficiently small to enable maintaining, at least under no-leak conditions, such range of mapped pressure-time environments essentially matching suborbital-flight pressure-time profile 501. Additionally, method 700 further comprises the preferred step 712 of selecting such volume of antechamber 126 to be large enough to enable maintaining, at least under maximum-projected-testable-leak conditions, such at least one range of mapped pressure-time environments essentially matching suborbital-flight pressure-time profile 501. Also, method 700 further comprises the preferred step 714 of attaching each of a plurality of antechambers 126 to a single main pressure vessel 124.

In addition, method 700 further comprises the preferred step 716 of computer-controlling and computer-measuring preferably with a single computer system (preferably control subsystem 134) a plurality of respective tests relative to such respective plurality of antechambers 126. Preferably, such computer-measuring of preferred step 716 preferably comprises data acquisition from main pressure vessel 124. Further, such plurality of antechambers 126 comprise sufficient similarity in design to efficiently enable standardized testing. This preferred concept preferably extends to the functional components of CPIS 139.

Figure 8:
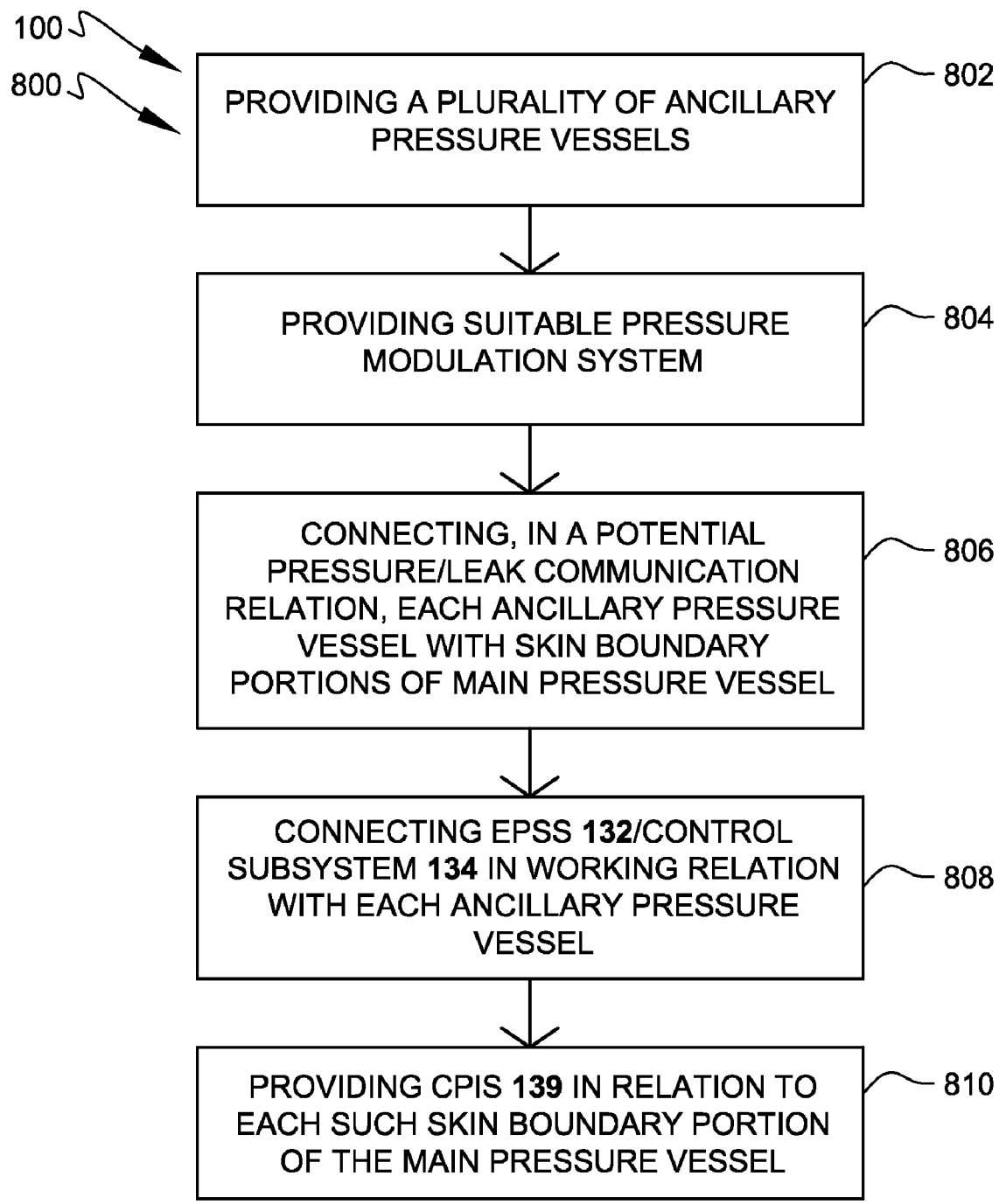
FIG. 8 shows an additional schematic diagram illustrating an alternate preferred method of implementing the ECLSS Human-rating Facility according to another preferred embodiment of the present invention.

FIG. 8 shows an additional schematic diagram illustrating an alternate preferred method of implementing the ECLSS Human-rating Facility, according to another preferred method of the present invention. Thus, in accordance with preferred method 800 of the present invention, there is provided, relating to leak effects within a primary pressure vessel (main pressure vessel 124) preferably comprising contents and at least one plurality of skin boundary portions, such method 800 preferably comprises the following preferred steps. First, preferably providing a plurality of ancillary pressure vessels (antechambers 126), with each ancillary pressure vessel being at least small enough in volume that EPSS 132/control subsystem 134, as selected and configured, is suitable to control at least one rapid pressure-time profile within the selected ancillary pressure vessels (antechambers 126), as indicated in preferred step 802. Such rapid pressure-time profile of step 802 preferably includes suborbital-flight pressure-time profile 501 of FIG. 5.

Next, preferably providing at least one such suitable pressure modulation system, as indicated in preferred step 804. This preferably includes hardware and software components of EPSS 132/control subsystem 134. Next, preferably connecting, in a potential pressure/leak communication relation, each such respective ancillary pressure vessel (antechamber 126) with at least one selected respective skin boundary portion of main pressure vessels 124, as indicated in preferred step 806. It is noted that those of ordinary skill in the art, upon reading the teachings of this specification, will now understand that, under appropriate circumstances, considering such issues as intended use, size of flight vehicle to be tested, etc., other main pressure vessel arrangements, such as coupling the ancillary pressure vessels to one or more modularly-coupled pressure vessels, etc., may suffice. Finally, preferably connecting such at least one suitable EPSS 132/control subsystem 134 in working relation with each ancillary pressure vessel (antechamber 126), as indicated in preferred step 808. The above-described preferred steps of method 800 preferably enable the ability of variable-altitude testing system 100 to perform multiple testing procedures of cabin-environments 118 using one or more simulated rapid-pressure-cycle environments generated within antechambers.

Even further, method 800 preferably comprises the preferred step 810 of providing, in relation to each such skin boundary portion of the main pressure vessel, at least one test-assisting apparatus (preferably CPIS 139). Preferred step 810 may preferably include the mounting of one or more preconfigured removable pressure barriers 172 between main pressure vessel 124 and one or more antechambers 126.

Most ECLSS subsystems 116 are subject to review and/or certification by at least one inspecting agency or certifying agency (such as the United States Federal Aviation Administration) prior to flight operation. Often, functional testing required by such agencies is only practical after partial or complete integration of the ECLSS subsystems into the final flight vehicle. Thus, the scheduling of ECLSS testing greatly dependent on overall vehicle production schedules. EHF 102 preferably offers a practical alternative to such post-integration testing by providing a convenient platform supporting comprehensive functional testing and certification of ECLSS subsystems, as they become available (even prior to vehicle integration), thus potentially enabling faster overall production-to-service schedules for flight vehicles.

Preferably, EHF 102 also functions as a training facility, preferably allowing training of crewmember 114 to be conducted away from the final flight vehicle 103 and in conditions more closely simulating actual flight environments. Thus, a test customer can test, abort, and explore other off-nominal operational modes that would be impossible during actual flight operation of flight vehicle 103 and thus gain confidence that ECLSS subsystems 116 will provide safety levels required by inspecting or certifying agencies.

The following table of the specification (Table A) includes a general parts list that may be used as a reference for preferred pressure-vessel component arrangements of OPSS 130 and static hardware components of EPSS 132. All preferred materials listed below are available from the Kurt J. Lesker Company of Pittsburgh, Pa., unless noted otherwise within the table.

TABLE A

| Part Number | Description | Qty |
| --- | --- | --- |
| CH-SPL032906HB | custom 72" OD chamber, 304SS (main pressure vessel 124) | 1 |
| F0275X000N | 2¾" CF blank flange | 11 |
| GA-0275 | 2¾" CF copper gasket, package of at least 10 | 2 |
| HBS25028138 | bolt set for 2¾" flanges | 3 |
| F0450X000N | 4½" CF blank flange | 2 |
| GA-0450 | 4½" CF copper gasket, package of at least 10 | 1 |
| HBS31224200 | bolt set for 4½" flanges | 1 |
| GA-0800 | 8" CF copper gasket, package of at least 10 | 1 |
| HBS31224225 | bolt set for 8" flanges | 4 |
| VPZL-800 | viewport, zero-length, SS, 5⅜" view area, 8" flange | 4 |
| F1200X000N | 12" CF blank flange | 2 |
| GA-1200 | 12" CF copper gasket, package of at least 10 | 1 |
| HBS31224250 | bolt set for 12" flanges | 3 |
| GA-1650 | 16½" CF copper gasket | 1 |
| HBS37524300 | bolt set for 16½" flanges | 1 |
| VZCUA150 | 8" CF copper gasket, package of at least 5 | 1 |
| C-0275 | 2¾" CF 4-way cross | 3 |
| DFF1325X000 | 13¼" CF double-faced flange, blank | 1 |
| DFF1325X1000 | 13¼" CF double-faced flange, bored | 1 |
| DFF1000X000 | 10" CF double-faced flange, blank | 1 |
| DFF1000X800 | 10" CF double-faced flange, bored | 1 |
| RF1000X0275 | 10" CF to 2¾" CF reducer flange | 1 |
| CH-DFF275X | custom 2¾" CF double-sided flange, (2) 5/16" Swagelok fittings on one side | 1 |
| GA-1650 | 16½" CF copper gasket | 1 |
| GA-1325V | 13¼" CF fluorocarbon gasket (flat) | 4 |
| GA-0275V | 2¾" CF fluorocarbon gasket (flat), package of 5 | 3 |
| GA-1200 | 12" CF copper gasket | 3 |
| GA-1000V | 10" CF fluorocarbon gasket (flat) | 4 |
| HBS37524400 | bolt set for 13¼" flanges | 1 |

TABLE A-continued

| Part Number | Description | Qty |
|---|---|---|
| HBK25028088 | bolt set for 2¾" flanges - reducer | 1 |
| HBS25028225 | bolt set for 2¾" flange - double-sided | 1 |
| HBS31224350 | bolt set for 10" flanges | 1 |
| EFT0084033 | 2¾" CF flange, 8-pin, 500 V power feedthrough | 2 |
| IFDRG327013 | 2¾" CF flange, 32-pin MPC multi-pin, circular feedthrough | 3 |
| MH-QF-C36 | vacuum hose for SV65 and SV100 | 2 |
| MH-QF-D36 | vacuum hose for SV200 | 1 |
| QF40XMNPT20 | adapter from SV65 and SV100 to hose | 2 |
| QF50XMNPT32 | adapter from SV200 to hose | 1 |
| R-FOM-PREP | Fomblin prep for SV100 | 1 |
| MFY14/6CA | Fomblin for SV100 | 1 |
| Spec-FF | special 1650 × 1325 reducer flange, 16½" to 13.25" Del Seal flange by MDC Vacuum Products Corp. of Hayward California | 1 |
| LH-95007 | Sogevac SV 65, 208-230/460 V, 60 Hz, (NEMA) with gas ballast valve | 1 |
| LH-95011 | Sogevac SV 100, 208-230/460 V, 60 Hz, (NEMA) with gas ballast valve | 1 |
| LH-95027 | Pump, rotary vane, SV200, 127 CFM, 7½HP, 208-230/460 V, 60 Hz, 3 PH | 1 |
| FN-1325 | 13¼" CF full nipple | 1 |
| FN-1000 | 10" CF full nipple | 1 |
| HBS37524300 | bolt set for 13¼" flanges | 2 |
| HBS31224250 | bolt set for 10" flanges | 2 |
| FTACIR32AC | multi-pin MPC instrumentation connector, 32 pin, air, crimp | 2 |
| FTACIR32V | multi-pin MPC instrumentation connector, 32 pin, vacuum | 2 |
| 150046 | 13¼" CF to 2¾" CF reducer flange by MDC Vacuum Products Corp. | 1 |
| KC40SV72M | QF40 centering flange with mesh screen by Varian, Inc. | 1 |
| KC50SV72M | QF50 centering flange with mesh screen by Varian, Inc. of Palo Alto California | 1 |
| FR120010004T | 12" CF to 10" CF reducer flange by Varian, Inc. | 1 |
| F0275X000N | 2¾" CF blank flange | 4 |
| HBS25028138 | bolt set for 2¾" flanges | 2 |
| QF40XMNPT16 | QF40 to 1" MNPT adapter | 2 |
| F0275XQF40 | 2¾" CF to QF40 flange | 2 |
| QF50XQF40 | QF50 to QF40 reducer flange | 1 |
| QF50-200-CHP | QF50 polymer lever clamp | 2 |
| QF50-200-SRV | QF50 Viton centering rings | 2 |
| QF40-150-CHP | QF40 polymer lever clamp | 3 |
| QF40-150-SRV | QF40 Viton centering rings | 3 |
| F0275XFNPT2 | 2¾" CF to ⅛" FNPT adapter | 2 |

Upon reading the teachings of this specification, those of ordinary skill in the art will now understand that, under appropriate circumstances, considering such issues as intended use, design preference, component availability, etc., other component arrangements, such as the use of alternate materials, alternate sizes, alternate quantities, etc., may suffice.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A method related to ground-based testing of onboard flight-vehicle systems utilizing simulated suborbital flight environments occurring during at least one essentially complete suborbital flight, within at least one range of mapped pressure-time environments, by at least one flight vehicle, said method comprising the steps of:

a) selecting at least one range of test variables required for a single test setup to test all situations within the variables;

b) for the selected required test setup, selecting at least one first pressure vessel to assist in simulating onboard flight-vehicle environments and selecting at least one adjoining second pressure vessel, having, with such first at least one pressure vessel, at least one common-boundary test apparatus, to assist in simulating extra-vehicular flight environments;

c) for at least one second pressure-vessel design, selecting at least one pressure-vessel volume suitable for all the required test variables; and d) for the at least one selected pressure-vessel volume and such at least one range of test variables, selecting hardware/software combinations, including pressure modulating devices, having suitable technology and cost characteristics and being adapted to assist in control and measurement of such at least one range of test variables;

e) wherein the steps of this method are used to produce at least one design useful in simulating pressure-time profiles corresponding to such suborbital flight environments during such at least one essentially complete suborbital flight by such at least one flight vehicle.

2. The method according to claim 1 further comprising the step of selecting such at least one volume of such second pressure vessel to be small enough to enable maintaining, at least under no-leak conditions, such at least one range of mapped pressure-time environments.

3. The method according to claim 2 further comprising the step of selecting such at least one volume of such second pressure vessel to be large enough to enable maintaining, at least under maximum-projected-testable-leak conditions, such at least one range of mapped pressure-time environments.

4. The method according to claim 3 further comprising the step of attaching each of a plurality of such at least one second pressure vessels with the same single one of such at least one first pressure vessel.

5. The method according to claim 4 wherein such plurality of such second pressure vessels comprise sufficient similarity in design to efficiently enable standardized testing.

6. The method according to claim 4 further comprising the step of computer-controlling and computer-measuring with a single computer system a plurality of respective tests relative to such respective plurality of such at least one second pressure vessels.

7. The method according to claim 6 wherein such computer-measuring comprises the step of receiving test data from such at least one first pressure vessel.

8. A system related to ground-based testing of onboard flight-vehicle systems, said system comprising:
a) suborbital-flight-environment simulator means for simulating dynamic flight environments occurring during at least one substantially complete suborbital flight by at least one flight vehicle;
b) wherein said suborbital-flight-environment simulator means comprises testing-chamber means for receiving such onboard flight-vehicle systems to be tested;
c) wherein said testing-chamber means comprises pressure boundary means for boundary containment of testing-chamber pressures within at least one interior portion of said testing-chamber means;
d) antechamber means for communicating with said pressure boundary means of said testing-chamber means;
e) pressure modulator means for modulating antechamber pressures within said antechamber means;
f) pressure-controller means for assisting timeline controlling of such antechamber pressures; and
g) chamber-pressure communicator means for enabling interactive pressure communication between such testing-chamber pressures and such antechamber pressures;
h) wherein said antechamber means comprises said pressure boundary means; and
i) wherein said antechamber means, said pressure modulator means, and said pressure-controller means are useful in simulating at least one pressure-time profile comparable to such flight environments occurring during such at least one substantially complete suborbital flight by such at least one flight vehicle.

9. A system related to ground-based testing of onboard flight-vehicle systems, said system comprising:
a) at least one suborbital-flight-environment simulator structured and arranged to simulate dynamic suborbital flight environments occurring during at least one essentially complete suborbital flight by at least one flight vehicle;
b) wherein said at least one suborbital-flight-environment simulator comprises at least one testing chamber structured and arranged to receive such onboard flight-vehicle systems to be tested; and
c) wherein said at least one testing chamber comprises at least one pressure boundary structured and arranged to provide boundary containment of testing-chamber pressures within at least one interior portion of said at least one testing chamber;
d) at least one antechamber structured and arranged to communicate with said at least one pressure boundary of said at least one testing chamber;
e) at least one pressure modulator structured and arranged to modulate antechamber pressures within said at least one antechamber;
f) at least one pressure-controller structured and arranged to assist timeline controlling of such antechamber pressures by said at least one pressure modulator; and
g) at least one chamber-pressure communicator structured and arranged to enable interactive pressure communication between such testing-chamber pressures and such antechamber pressures under flow conditions;
h) wherein said at least one antechamber comprises said at least one pressure boundary; and
i) wherein said at least one antechamber, said at least one pressure modulator, and said at least one pressure-controller are useful in simulating pressure-time profiles corresponding to such suborbital flight environments during such at least one essentially complete suborbital flight by such at least one flight vehicle.

10. The system according to claim 9 wherein:
a) said at least one pressure-controller comprises at least one pressure-time record structured and arranged to contain at least one timeline sequence of pressure setpoints corresponding to varying pressures of such at least one pressure-time profile; and
b) said at least one pressure-controller is structured and arranged to utilize said at least one pressure-time record, essentially during interoperation with said at least one pressure modulator, to modulate such antechamber pressures to essentially match such varying pressures of such at least one pressure-time profile.

11. The system according to claim 10 wherein:
a) said at least one pressure-controller comprises at least one pressure-time monitor structured and arranged to monitor such antechamber pressures during such timeline controlling of such antechamber pressures by said at least one pressure modulator;
b) said at least one pressure-time monitor is structured and arranged to generate antechamber pressure data; and
c) said at least one pressure-controller is structured and arranged to
  i) compare such antechamber pressure data to at least one setpoint of such at least one timeline sequence of pressure setpoints, and
  ii) interoperate with said at least one pressure modulator to adjust such antechamber pressures to essentially match such at least one setpoint.

12. The system according to claim 11 wherein said at least one chamber-pressure communicator comprises at least one configurable fluid exchanger structured and arranged to provide configurable exchange of at least one atmospheric fluid between said at least one testing chamber and said at least one antechamber.

13. The system according to claim 11 wherein said at least one pressure-time monitor comprises at least one electronic pressure transducer structured and arranged to generate such antechamber pressure data.

14. The system according to claim 13 wherein said at least one chamber-pressure communicator comprises at least one gas transfer passage enabling fluid flow.

15. The system according to claim 11 wherein said at least one pressure modulator comprises:
   a) at least one negative-pressure source structured and arranged to provide negative pressure;
   b) at least one positive pressure source structured and arranged to provide positive pressure; and
   c) at least one pressure manifold structured and arranged to communicate such negative pressure and such positive pressure to said at least one antechamber;
   d) wherein said at least one pressure manifold comprises at least one pressure-control assembly structured and arranged to control levels of such negative pressure and such positive pressure communicated to said at least one antechamber; and
   e) the operation of said at least one pressure-control assembly is at least partially controlled by said at least one pressure-controller.

16. The system according to claim 15 further comprising a plurality of said at least one antechambers, each one capable of independent pressure generation with respect to said at least one pressure boundary of said at least one testing chamber.

17. The system according to claim 15 further comprising:
   a) at least one modular coupler structured and arranged to assist coupling of said at least one testing chamber to at least one additional testing chamber structured and arranged to receive such onboard flight-vehicle systems to be tested;
   b) wherein said at least one modular coupler is structured and arranged to enable pressure communication between such testing-chamber pressures of said at least one testing chamber and at least one interior portion of said at least additional one testing chamber.

18. The system according to claim 15 wherein said at least one pressure-control assembly comprises:
   a) at least one negative-pressure control valve structured and arranged to control negative pressure communicated between said at least one negative-pressure source and said at least one pressure manifold; and
   b) at least one positive-pressure control valve structured and arranged to control positive pressure communicated between said at least one positive-pressure source and said at least one pressure manifold;
   c) wherein the operation of at least said at least one negative-pressure control valve is controlled by said at least one pressure-controller.

19. The system according to claim 15 wherein said at least one pressure-controller comprises:
   a) at least one pressure control algorithm to assist control of at least one chamber pressure using essentially said at least one pressure-time record and such pressure sensor data;
   b) at least one computer storage to store said at least one pressure control algorithm and said at least one pressure-time record;
   c) at least one computer input structured and arranged to receive such pressure sensor data;
   d) at least one computer processor to process said at least one pressure control algorithm; and
   e) at least one computer output structured and arranged to output at least one algorithm-derived control signal to assist control of the operation of said at least one pressure modulator.

* * * * *